United States Patent [19]
Rabilloud et al.

[11] 4,202,960
[45] May 13, 1980

[54] THERMOSETTING AROMATIC RESINS AND THERMOSTABLE POLYMERS DERIVED THEREFROM

[75] Inventors: Guy Rabilloud, Grenoble; Bernard Masson, Poisat; Pierre Giuliani; Bernard Sillion, both of Grenoble, all of France

[73] Assignee: Institut Francais du Petrole, Rueil Malmaison, France

[21] Appl. No.: 834,026

[22] Filed: Sep. 16, 1977

[30] Foreign Application Priority Data

Sep. 17, 1976 [FR] France .................. 76 28408

[51] Int. Cl.² .................................. C08G 61/02
[52] U.S. Cl. ........................ 528/271; 528/395; 528/396; 568/331; 568/323
[58] Field of Search .................. 260/2 H, 590 D; 528/271, 396, 395

[56] References Cited

U.S. PATENT DOCUMENTS

| | | | |
|---|---|---|---|
| 3,342,754 | 9/1967 | Gorham | 260/2 H |
| 3,565,832 | 2/1971 | Bilow et al. | 260/2 H |
| 4,064,176 | 12/1977 | Rabilloud et al. | 260/590 D |

*Primary Examiner*—Wilbert J. Briggs, Sr.
*Attorney, Agent, or Firm*—Millen & White

[57] ABSTRACT

Thermostable, infusible and insoluble polymer obtained by thermosetting aromatic oligomers of low molecular weight in the presence of an acid catalyst, said aromatic oligomers having an average molecular weight up to about 5000, a softening temperature from 80° to 400° C. and being obtained by separation from the reaction mixture produced by reacting meta-terphenyl with acetyl chloride and aluminum chloride.

34 Claims, No Drawings

THERMOSETTING AROMATIC RESINS AND THERMOSTABLE POLYMERS DERIVED THEREFROM

This invention concerns new thermosetting aromatic resins and their use in the manufacture of thermostable polymers.

One of the objects of the present invention is to provide aromatic oligomers of low molecular weight, easily meltable and soluble in conventional organic solvents, adapted for the manufacture of molded articles or composite materials capable of withstanding high temperatures.

Another object of the invention is to provide methods for transforming said fusible and soluble aromatic oligomers to infusible and insoluble thermostable polymers having a high coke content, after carbonisation.

The present invention, more particularly, concerns resins which are formed during the reaction of m-terphenyl with acetyl chloride and aluminum chloride, i.e. acetylation reaction of m-terphenyl.

In the French patent specification No. 73/45637, there has been described a process for the manufacture of mono-acetyl and diacetyl derivatives of meta-terphenyl.

Thus, for example, for the manufacture of diacetyl derivatives of meta-terphenyl, the process described consisted more particularly of reacting acetyl chloride and aluminum chloride in substantially equal amounts with a convenient amount of meta-terphenyl, at a temperature from $-80°$ to $+20°$ C., preferably from $-30°$ to $0°$ C.; after a period from a few minutes to several hours, the reaction mixture is heated to a higher temperature, preferably from $10°$ to $80°$ C., and maintained at said temperature for a few hours. Then the reaction mixture is subjected to acid hydrolysis; the precipitated 4,4″-diacetyl p-terphenyl, which was formed during the reaction, is separated and, after washing and neutralization of the mixture and evaporation of the solvent, the mixture is distilled under vacuum for separating the unreacted meta-terphenyl and the desired monoacetyl and diacetyl derivatives.

It has now been discovered that it was possible to direct this reaction to the formation of fusible and soluble aromatic oligomers by slightly changing the operating conditions and particularly the temperature, the reaction time and/or the amount of aluminum chloride involved. The formation of these oligomers is the more surprising as it appears to be specific to meta-terphenyl. As a matter of fact, under the same conditions, the o-terphenyl and p-terphenyl essentially lead to the formation of the corresponding diacetyl compounds, i.e. the 4,4″-diacetyl o-terphenyl and 4,4″-diacetyl p-terphenyl, with yields higher than 80%.

Moreover, it has been observed that it was possible to transform these aromatic oligomers to infusible and insoluble polymers, by heating them with an acid catalyst. Accordingly, they behave as thermosetting resins and they can be used in a number of practical fields of application requiring molded materials or thermostable composite materials.

The term aromatic oligomers, as used in the present specification, means all the resinous products formed from m-terphenyl when said hydrocarbon is treated with a mixture of acetyl chloride and aluminum chloride. The precise chemical nature of these oligomers is not known with accuracy. It was only possible to determine by spectrochemical methods (UV, IR and NMR) that they contain not only many benzenic rings but also condensed cycles as fluorene and naphthalene. The presence of heterocyclic structures containing oxygen atoms, methyl radicals, acetyl radicals, and a few olefinic double bonds, is also observed. The fractionation attempts, by means of solvents, also show that the aromatic oligomers, as above defined, are complex mixtures of molecules having very different molecular weights ranging from 300 to several thousands.

The aromatic oligomers considered in this invention are prepared by reacting a molar equivalent of m-terphenyl with at least two molar equivalents of acetyl chloride and aluminum chloride, the initial period of the reaction being conducted at low temperature, preferably from $-50°$ to $0°$ C. The formation of aromatic oligomers is more easily controlled when the reaction is conducted in an inert solvent wherein they are soluble as for example, methylene chloride, tetrachloroethane or nitrobenzene. Conversely, solvents such as carbon sulfide, petroleum ether or hexane are favorable since they would be liable to produce the precipitation of the oligomers in the course of the reaction.

During the acetylation of m-terphenyl, the formation of resinous products is competitive with that of simple substitution compounds and, in order to favor the former well defined operating conditions are to be used.

The amount of the formed aromatic oligomers is the higher as the reaction is longer, but, on the other hand, the average molecular weight and the softening temperature of the oligomers increase with the reaction time. The latter will thus be chosen in accordance with the desired physical properties of the resin. In most cases, a reaction time from 10 to 40 hours makes it possible to synthesize fusible and soluble oligomers with a yield higher than 50% with respect to the m-terphenyl involved.

Another important condition is the reaction temperature, on which depends the increase of the molecular weight of the formed oligomers. The initial condensation step is advantageously conducted at low temperature, for example from $-50°$ to $0°$ C., in order to compensate for the exothermicity of the reaction and to favorably direct the latter to the desired type of products. When all the reactants have been admixed, the reaction may be continued, for example between $0°$ C. and $80°$ C., but, above $20°$ to $30°$ C., it becomes difficult to control it in view of its excessive velocity. On the contrary, a temperature from $10°$ to $20°$ C. makes it possible to follow the progress of the condensation and to terminate the formation of aromatic oligomers at the desired level.

The respective amounts of reactants involved may vary within a substantially wide range, but the yield of aromatic oligomers is improved when a molar equivalent of m-terphenyl is treated with about 2 molar equivalents of acetyl chloride and more than 2 molar equivalents (e.g. from 2 to 3) of aluminum chloride. It has been observed that an excess of aluminum chloride with respect to the stoichiometry of the complex 1/1 which it forms with the acetyl chloride, provides for the conversion of almost all the m-terphenyl to aromatic oligomers, whereas the yield is much lower when operating with an insufficiency of aluminum chloride.

The order of introduction of the reactants is less important than the above-mentioned operating conditions but it is advantageous, in order to control the reaction well, to first prepare a complex between acetyl chloride and aluminum chloride in solution and to add subsequently the m-terphenyl to the solution of complex maintained at low temperature. The progress of the reaction may be observed by measuring the average molecular weight and the softening temperature, these measurements being effected on samples withdrawn at regular time intervals, after hydrolysis thereof.

At the end of the reaction, the reaction mixture is hydrolyzed over a mixture of water and ice containing a strong mineral acid, such for example as HCl or $H_2SO_4$. The organic phase is washed several times with water and then made clearly alkaline by addition of a base such as sodium hydroxide, potassium hydroxide, ammonia, sodium or potassium carbonates, since it is absolutely necessary to neutralize any kind of residual acidity so that the aromatic oligomers be not subjected to any substantial modification of their physical properties during time.

For synthesizing the aromatic oligomers considered in this invention, there is used, as above described, acetyl chloride, aluminum chloride and pure m-terphenyl. It has however been observed that the latter may be partially or totally replaced by 4'-acetyl m-terphenyl without a substantial difference being observed in the nature of the formed oligomers. On the contrary, when pure m-terphenyl is replaced by an industrial mixture of terphenyls containing variable proportions of meta, ortho and para isomers, it is necessary, at the end of the reaction, to remove the 4,4"-diacetyl ortho-and para-terphenyls, which do not take part to the formation of the oligomers.

The fusible and soluble aromatic oligomers obtained as above described appear in the form of a powder whose color varies from very light yellow to dark red, depending on their constitution. The melting properties and the solubility depend on the average molecular weight of the oligomers. When the latter is between 300 and 1000, the melting temperature is from 80° C. to 250° C. and the aromatic oligomers are soluble in many conventional organic solvents such as methylene chloride, chloroform, tetrachloroethane, trichloroethylene, dioxane, tetrahydrofuran, the ethers and esters of ethyleneglycol and diethyleneglycol, chlorobenzene, acetophenone, phenol, cresols, halogenated phenols, nitrobenzene, dimethylformamide, dimethylacetamide, dimethylsulfoxide, N-methylpyrrolidone, tetramethylenesulfone, methylethylketone, methylisobutylketone, etc. They are partially soluble in aromatic hydrocarbons, alcohols heavier than butanol, ethers, tetrahydronaphthalene and decahydronaphthalene. Finally, they are insoluble in aliphatic hydrocarbons, methanol and ethanol. With a molecular weight from 1000 to 5000, the melting temperature ranges from 200° C. to 400° C. and only the chlorinated solvents, phenols, acetophenone, dioxane, tetrahydrofuran and polar aprotic solvents dissolve the aromatic oligomers.

The term "average molecular weight," as used in the present specification, defines the value obtained by tonometry (vapor pressure measurements) in tetrahydrofuran, but it does not indicate the distribution of the different molecular weights about said average value. Thus, a mixture of oligomers with M=900 for example, contains a large number of products for which $300 < M < 5000$.

Inasmuch as the aromatic oligomers considered in this invention are intended to be used for well defined practical applications, such as the manufacture of molded articles or composite materials, it is obviously preferable to synthesize products easy to process within the limits of present industrial capability. It is known for example that a melting temperature between 100° C. and 180° C. allows the use of the existing material in presses, autoclaves, ovens, etc. Similarly, their solubility in the industrial solvents facilitates the operations of coating fibers, threads or fabrics, or the production of mixtures with inert mineral fillers. The oligomerization is therefore discontinued as soon as the properties of the mixture seems suitable to the type of contemplated application.

The aromatic oligomers such as above defined are stable in the solid state or as solutions, as long as the medium in which they exist is neutral or slightly basic. On the contrary, in the presence of a catalytic amount of acid, the condensation reaction may continue and produce highly cross-linked polymers, which are infusible and insoluble in organic solvents. As acids there can be used hydrochloric, hydrobromic and hydrofluoric acids, sulfuric acid, phosphoric and polyphosphoric acids, aromatic sulfonic acids and Lewis acids, such for example $BF_3$ or $AlCl_3$. The acid amount may vary from 0.05% to 10% by weight with respect to the resin, but it seems that the optimum amount is from 1 to 5% by weight.

The cross-linking reaction may be conducted in solution, in the solid phase or in the molten state, according to the type of contemplated use. The reaction velocity becomes substantial only above 100° C. and, more precisely, above the melting temperature of the aromatic oligomers used. The oligomers first become molten and then progressively set with the elimination of volatile compounds. The temperature is then brought up to 300° C., then 350° C., to complete the condensation reaction. The obtained polymers are infusible and completely insoluble in organic solvents. The thermogravimetric analysis of these polymers, carried out in a thermobalance programed for a temperature rise of 60° C. per hour, shows that the weight loss at 700° C. is close to 15% in an inert atmosphere or in the presence of air.

The invention will be described more in detail by the specific examples given below, wherein the details are given for illustrative but not limitative purposes. In these examples, the average molecular weights have been measured by tonometry in tetrahydrofuran and the softening temperatures with a Kofler melting bench. Examples 2 and 3 are given by way of comparison to show that the formation of aromatic oligomers is specific to m-terphenyl and does not occur with ortho and para-terphenyls.

EXAMPLE 1

780 g (9.93 moles) of acetyl chloride are added to a suspension of 1300 g (9.95 moles) of aluminum chloride in 2.5 l of methylene chloride, cooled down to −15° C. To the solution of acylation complex, there is subsequently added 950 g (4.13 moles) or pure m-terphenyl dissolved in 2.5 l of the same solvent.

The stirring is continued for 3 hours at −10° C., then for one night at room temperature. The mixture is then hydrolyzed over 5 kg of ice and 0.5 l of concentrated hydrochloric acid. The organic phase is allowed to settle, then filtered to remove 4,4"-diacetyl p-terphenyl, and then washed with water several times, and finally with an aqueous solution of $Na_2CO_3$ up to the disappearance of any residual acidity.

After evaporation of methylene chloride, the reaction mixture is subjected to a distillation under vacuum for the removal of the substitution products which distill up to 250° C. under a pressure of 0.1 mm of mercury. The resinous oligomers, which form the distillation residue, amount to 755 g. They have an average molecular weight of 840 and a softening temperature of 150° C.

By treating 50 g of this mixture successively with ethanol, n-butanol and decahydronaphthalene, it is possible to separate it into fractions having average molecular weights ranging from 400 to more than 3000. For example, the following fractionation can be obtained:

| fraction 1 | : 11 g (22%); | M = 400; | $T_R$ = 80°-100° C. |
|---|---|---|---|
| fraction 2 | : 14 g (28%); | M = 710; | $T_R$ = 120°-130° C. |
| fraction 3 | : 2 g ( 4%); | M = 850; | $T_R$ = 185°-195° C. |
| fraction 4 | : 13 g (26%); | M = 890; | $T_R$ = 190°-200° C. |
| fraction 5 | : 5 g (10%); | M = 1600; | $T_R$ = 255°-260° C. |
| fraction 6 | : 3 g ( 6%); | M = 2400; | $T_R$ = 280° C. |
| fraction 7 | : 2 g ( 4%); | M = 3800; | $T_R$ = 380° C. |

The nature of the oligomers forming these different fractions is not known since each of them is really a complex mixture whose composition varies according to the amount of solvent used during fractionation. In the above example, elementary analysis merely indicates that the carbon and hydrogen percentages vary from one fraction to the other within large proportions. Thus for example, it has been found:

| for fraction 1 | : C % = 75.3 | H % = 5.1; |
|---|---|---|
| for fraction 4 | : C % = 87.5 | H % = 6.9; |
| for fraction 6 | : C % = 92.5 | H % = 5.4; and |
| for fraction 7 | : C % = 93.5 | H % = 5.5 |

EXAMPLE 2

This example, given by way of comparison, shows that the acetylation reaction of ortho-terphenyl, conducted under the same conditions, produces mainly 4,4''-diacetyl o-terphenyl, free of resinous byproducts.

124 g (0.54 mole) of o-terphenyl is reacted with a mixture of 160 g (1.20 mole) of aluminum chloride and 90 g (1.146 mole) of acetyl chloride dissolved into 2.5 l of methylene chloride. The mixture is hydrolyzed after 24 h of reaction and treated in the usual way. There is obtained 162 g (96%) of raw product. A recrystallization in 3.6 l of ethanol yields 145 g (86%) of pure 4,4''-diacetyl o-terphenyl. F=191° C. Analysis: $C_{22}H_{18}O_2$. M=316 (calculated: 314)

EXAMPLE 3

This example, also given by way of comparison, shows that paraterphenyl reacts with acetyl chloride to produce exclusively 4,4'-diacetyl p-terphenyl free of resinous by-products.

The acylation complex is prepared at −15° C. by reacting 93.4 g (0.7 mole) of aluminum chloride with 55 g (0.7 mole) of acetyl chloride in 0.3 l of $CH_2Cl_2$. After addition of 69 g (0.3 mole) of p-terphenyl dissolved in the same solvent, the mixture is stirred for 20 hours at room temperature before being hydrolyzed and neutralized in the usual way. After evaporation of methylene chloride, it remains 84 g (89% of pure 4,4''-diacetyl p-terphenyl.

F=288° C. Analysis: $C_{22}H_{18}O_2$. M=314 by mass spectrometry.

EXAMPLE 4

27 g (0.1 mole) of 4'-acetyl m-terphenyl are complexed at −20° C. with 13 g (0.097 mole) of aluminum chloride and transferred, at low temperature, to a flask containing 20 g of $AlCl_3$ (0.15 mole), 15 g of acetyl chloride (0.19 mole) and methylene chloride. After being warmed to room temperature, a portion of the solution is withdrawn and then hydrolyzed after 5 hours, 10 h and 24 h of reaction. The resulting products are treated with boiling ethanol, a portion being soluble in said solvent. The fraction insoluble in ethanol amounts to 10%, 25% and 72% by weight of the product after respectively 5, 10 and 24 h. The average molecular weights of these fractions are respectively 1100, 740 and 860. The portion of the product which remains in solution in alcohol is essentially 4'-acetyl m-terphenyl.

The compound obtained after 24 hours of reaction, having an average molecular weight of 840, is treated with n-butanol. The fraction insoluble in said alcohol amounts to 15% of the oligomers, with an average molecular weight M=2300; the portion which recrystallizes from butanol represents 18% with M=1700.

Finally the fraction soluble in said solvent has a molecular weight M=700.

EXAMPLE 5

In this reaction, the pure m-terphenyl is replaced with an industrial mixture of terphenyls containing respectively 20%, 75% and 5% of ortho, meta and para isomers.

The condensation is conducted as in example 1, with 4 kg of aluminum chloride (29.9 moles), 2.4 kg of acetyl chloride (30.57 moles) 3 kg (13 moles) of industrial terphenyl and 11 liters of methylene chloride. After hydrolysis and neutralization of the solution, the 4,4''-diacetyl p-terphenyl is separated by filtration, then the solvent is evaporated. The residue is dissolved into 5 l of carbon tetrachloride and this solution, cooled down to −15° C., gives a precipitate of about 600 g of 4,4''-diacetyl o-terphenyl. The mono- and diacetyl compounds of m-terphenyl are then extracted with 14 times 5 liters of boiling ethanol.

The residue insoluble in ethanol is a mixture of resinous oligomers weighing 1.35 kg, having an average molecular weight M=890 and a softening temperature of 140° C.

By extraction of said resin (50 g) with 1 liter of boiling n-butanol, there can be separated an insoluble portion weighing 30 g, i.e. 60% by weight, consisting of oligomers having an average molecular weight M=2600 and a softening temperature $T_R$=200°-225° C.

EXAMPLE 6

In this example, aluminum chloride is used in excess with respect to the stoichiometry of the complex 1/1 which it forms with acetyl chloride. 230 g (1 mole) of pure m-terphenyl are added at −10° C. to a mixture of 399 g of aluminum chloride (3 moles) and 157 g of acetyl chloride (2 moles) in 1.5 l of $CH_2Cl_2$. After 24 hours of reaction, the hydrolyzed and neutralized mixture gives 275 g of resinous oligomers having an average molecular weight M=840 and a softening temperature $T_R$=145° C. An extraction of this mixture with ethanol shows that the proportion of substitution products is lower than 5%.

EXAMPLE 7

The mixture of terphenyl isomers used in this example is first subjected to a distillation under vacuum for removing o-terphenyl. The starting product contains 23.6% of o-terphenyl, 69.4% of m-terphenyl and 7% of p-terphenyl.

15 kg (65 moles) of this mixture are fed to a flask of 20 l equipped with a distillation column of 75×1500 mm, filled with porcelain rings. The distillation is conducted with a reflux rate of 10/1 whereby the following fractions are separated:

(1)—$Eb_{0.3}=164°$ C.; weight: 3.66 kg; composition: ortho: 89.1%; meta: 10.9%.

(2)—$Eb_{0.5}=172°$ C.; weight: 2.88 kg; ortho: 8.3% meta: 87%; para: 4%.

(3)—The tank bottom fraction is dissolved in 15 kg of $CH_2Cl_2$, wherefrom, by cooling, 0.33 kg of para-terphenyl precipitates.

The evaporation of the solvent gives 8 kg of a mixture containing 88.8% of meta and 11.2% of para-terphenyl.

The condensation reaction is carried out in a 20 l reactor equipped with a propeller stirrer, a cooling coil, a feeding funnel and a series of absorbers used for neutralizing the liberated hydrochloric acid.

The reactor is fed with 2.8 kg (21 moles) of aluminum chloride and 3.5 liters of methylene chloride. This suspension is stirred and cooled in 1 hour to $-41°$ C. 11 kg of acetyl chloride (14 moles) are then added in one hour while the temperature increases to $-30°$ C. The feeding funnel is fed with 5.194 kg of a solution in methylene chloride of 1.612 kg (7 moles) of the terphenyls mixture produced in the preceding distillation and containing 88.8% of meta isomer and 11.2% of para isomer. This solution is added in 1.5 hour and then the funnel is rinsed with 3.5 liters of methylene chloride.

The temperature is then allowed to increase to 8°–11° C. and the mixture is stirred under these conditions for 24 hours, after which 7 liters of solvent are added thereto and the mixture is cooled to $-40°$ C. before being transferred to the hydrolysis reactor.

This reactor is a 60 l vessel equipped with a turbine stirrer, containing 15 l of water, 13.5 kg of ice, 1.5 kg of concentrated sulfuric acid and 0.1 kg of filtration adjuvant. Once empty, the condensation reactor is washed with 4 l of methylene chloride which are then added to the mixture during the hydrolysis step. After decantation, the organic phase is filtered for the removal of the para-terphenyl derivatives, then subjected to a series of 4 washings with 15 l of water for 15 to 30 minutes. The neutralization of the residual acidity is achieved in 13 h with 15 l of water. The organic phase is decanted and filtered over sodium carbonate. The solvent is evaporated under reduced pressure at 40° C. to give 1.62 kg of aromatic oligomers having an average molecular weight $M=785$ and a softening temperature of 132°–135° C.

EXAMPLE 8

10 g of resin from example 1 and 0.4 g of para-toluenesulfonic acid are dissolved in 10 l of chloroform. After stirring for 15 minutes, the solvent is evaporated and the catalyzed residue is distributed to test tubes which are heated at temperatures ranging from 200° to 350° C. The progress of the polycondensation is observed by measuring the weight loss ($\Delta P$) due to volatile products, the softening temperature ($T_R$), the average molecular weight (M) and the solubility in chloroform, given in cc of required solvent for dissolving 1 g of resin (Table I).

TABLE I

| T (°C.) | TIME (mn) | $\Delta P$ (%) | $T_R$ (°C.) | M | SOLUBILITY (ml) |
|---|---|---|---|---|---|
| 200 | 2 | 6.2 | 210 | 900 | Very high |
| 200 | 6 | 10.4 | 215 | 900 | Very high |
| 200 | 8 | 10.8 | 225 | 1000 | 2 |
| 200 | 14 | 11 | 250 | 1100 | 4 |
| 200 | 16 | 11.1 | 265 | 1300 | 6 |
| 200 | 20 | 11.6 | 275 | 3000 | 25 |
| 300 | 30 | 15 | >400 | — | insoluble |
| 350 | 30 | 17 | >400 | — | insoluble |

The heat-cured resin, pyrolized in an inert atmosphere for 1 hour at 900° C., gives 77% by weight of coke.

EXAMPLE 9

10 g of resin from example 5, catalyzed with 0.31 g of hydrochloric acid, are heated for 30 mn to each of the following temperature: 100°, 150°, 200°, 250°, 300° and 350° C. At the end of the reaction, it is converted to an infusible and insoluble brown mass. This product is subjected to thermogravimetric analysis in air and in an argon atmosphere. Table II indicates the weight loss of the heat-cured resin at different temperatures.

TABLE II

| ATMOSPHERE | % WEIGHT LOSS AT TEMPERATURES OF | | | | | | |
|---|---|---|---|---|---|---|---|
| | 300° C. | 400° C. | 500° C. | 600° C. | 700° C. | 800° C. | 900° C. |
| Argon | 0 | 3.5 | 10 | 16 | 17 | 19 | 21 |
| Air | 0 | 4 | 12 | 16.5 | 18 | — | — |

EXAMPLE 10

20 g of the resin of example 4, catalyzed by addition of 3% by weight of concentrated sulfuric acid, are compacted in a cylindrical mold of 10 cm diameter which is placed between the plates of a hydraulic press heated to 200° C. After 20 mn of heating to this temperature, the resin is subjected to a pressure of 200 kg/cm² and the whole is heated for 1 h at 300° C. and 1 h at 350° C.

After stripping, there is obtained a homogeneous disc of heat-cured resin which retains 82% of its weight after 1 h of pyrolysis in an inert atmosphere at 900° C.

EXAMPLE 11

100 g of resin from example 7 are dissolved in a mixture of 200 ml of chloroform and 60 ml of acetophenone. After addition of 2 g of sulfuric acid dissolved in 20 ml of ethyl ether, this solution is used for coating a woven glass fabric (E 181). The impregnated fabric is dried for 1 h at 20° C., 1 h at 40° C. and 1 h at 80° C. It is then cut out into 16 elements of 10×10 cm which are superimposed and placed between the plates of a hydraulic press, heated to 200° C. After a 15 minutes contact, the pressure is brought to 200 kg/cm$^2$ and the temperature to 300° C. and then to 350° C. for 2 hours. The resulting material contains 34% of resin; it has a specific gravity of 1.88 and its limit bending strength before breakage is 25 kg/mm$^2$.

What we claim is:

1. A process for the preparation of a thermostable, infusible, insoluble polymer, comprising the steps of:
   (i) reacting meta-terphenyl with acetyl chloride and aluminum chloride under such conditions as to form oligomers;
   (ii) separating an organic phase oligomer-containing composition comprising components having a molecular weight of about from 300 to 5000, said composition having a softening temperature from about 80° to 400° C. and a predominant fraction of the contained oligomers having a substantially higher percentage of combined percentages of carbon plus hydrogen than the combined percentages of carbon plus hydrogen in diacetyl meta-terphenyl; and
   (iii) heating the resulting composition to a sufficient temperature and for a sufficient time in the presence of an acid catalyst to yield said thermostable, infusible, insoluble polymer.

2. A process according to claim 1 wherein item (i) includes:
   a step (a) wherein meta-terphenyl is contacted with acetyl chloride and aluminum chloride, in a proportion of 2 moles of acetyl chloride and more than 2 moles of aluminum chloride per mole of meta-terphenyl, at a temperature ranging from −50° to 0° C.; and
   a step (b) wherein the reaction mixture formed in step (a) is heated to a temperature from 0° to 80° C., for a sufficient time to obtain a reaction product having the desired average molecular weight and softening temperature;
   and wherein item (ii) includes:
   a step (c) wherein the product from step (b) is subjected to acid hydrolysis and the organic phase is neutralized and separated.

3. A process according to claim 2, wherein steps (a), (b) and (c) are conducted in the presence of a solvent selected from methylene chloride, tetrachloro-ethane and nitrobenzene, said solvent being removed at the end of step (c).

4. A process according to claim 3 wherein in step (a), the acetyl chloride and the aluminum chloride are first reacted together so as to form a complex in solution, and meta-terphenyl is added to said complex solution.

5. A process according to claim 2, wherein step (b) is conducted at a temperature from 10° to 20° C.

6. A process according to claim 2, wherein the reaction time in steps (a) and (b) is from 10 to 40 hours.

7. A process according to claim 2, wherein step (a) is performed with the use of about 3 moles of aluminum chloride per mole of meta-terphenyl.

8. A process conforming with claim 2, except that in step (a), at least a portion of meta-terphenyl is replaced by 4'-acetyl-meta-terphenyl.

9. A process according to claim 1, wherein said oligomer containing composition has an average molecular weight of not higher than 1000 and softening temperature of about 80° to 250° C.

10. A process according to claim 1, wherein said oligomer-containing composition has an average molecular weight higher than 1000 and a softening temperature of about 200° to 400° C.

11. A process according to claim 1, wherein the oligomer-containing composition has a softening temperature of about from 100° to 180° C.

12. A process according to claim 1, wherein in step (iii), the acid catalyst is used in a proportion from 0.05 to 10% by weight with respect to the weight of said oligomer-containing composition.

13. A process according to claim 12, wherein in step (iii) the acid catalyst is used in a proportion of 1 to 5% by weight with respect to the weight of said oligomers composition.

14. A process according to claim 11, wherein step (iii) includes heating to a temperature higher than the softening temperature of the oligomer-containing composition involved and completing the condensation by raising the temperature to about 300°–350° C.

15. Thermostable polymer as obtained according to the process of claim 1.

16. Thermostable polymer as obtained according to the process of claim 2.

17. Thermostable polymer as obtained according to the process of claim 14.

18. A process according to claim 2, wherein the proportion of aluminum chloride is not more than about 3 moles.

19. A process for producing an organic phase oligomer-containing composition comprising components having a molecular weight of about from 300 to 5000, said composition having a softening temperature of from 80° to 400° C. and a predominant fraction of the contained oligomers having a substantially higher percentage of combined percentages of carbon plus hydrogen than the combined percentages of carbon plus hydrogen in diacetyl meta-terphenyl, said process comprising the steps of:
   (a) contacting meta-terphenyl with acetyl chloride and aluminum chloride, in a proportion of 2 moles of acetyl chloride and more than 2 moles of aluminum chloride per mole of meta-terphenyl, at a temperature ranging from −50° to 0° C.;
   (b) heating the reaction mixture formed in step (a) to a temperature from 0° to 80° C., for a sufficient time to obtain a reaction product having the desired average molecular weight and softening temperature; and
   (c) subjecting the product from step (b) to acid hydrolysis and neutralizing and separating the resultant organic phase.

20. A process according to claim 19, wherein steps (a), (b) and (c) are conducted in the presence of a solvent selected from methylene chloride, tetrachloro-ethane and nitrobenzene, said solvent being removed at the end of step (c).

21. A process according to claim 19, wherein in step (a), the acetyl chloride and the aluminum chloride are first reacted together so as to form a complex in solution, and meta-terphenyl is added to said complex solution.

22. A process according to claim 19, wherein step (b) is conducted at a temperature from 10° to 20° C.

23. A process according to claim 19, wherein the reaction time in steps (a) and (b) is from 10 to 40 hours.

24. A process according to claim 19, wherein step (a) is performed with the use of not more than about 3 moles of aluminum chloride per mole of meta-terphenyl.

25. A process conforming with claim 19, except that in step (a), at least a portion of meta-terphenyl is replaced by 4'-acetyl-meta-terphenyl.

26. A process according to claim 19, wherein said oligomer-containing composition has an average molecular weight of not higher than 1000 and softening temperature of about 80° to 250° C.

27. A process according to claim 19, wherein said oligomer-containing composition has an average molecular weight higher than 1000 and a softening temperature of about 200° to 400° C.

28. A process according to claim 19, wherein the oligomer-containing composition has a softening temperature of about from 100° to 180° C.

29. A process for the preparation of a thermostable, infusible, insoluble polymer, which comprises the step of heating an organic phase oligomer-containing composition comprising components having a molecular weight of about from 300 to 5000, said composition having a softening temperature from about 80° to 400° C. and a predominant fraction of the contained oligomers having a substantially higher percentage of combined percentages of carbon plus hydrogen than the combined percentages of carbon plus hydrogen in diacetyl meta-terphenyl, to a sufficient temperature and for a sufficient time in the presence of an acid catalyst to yield said thermostable, infusible, insoluble polymer, said oligomer-containing composition having been prepared by the steps of:

(a) contacting meta-terphenyl with acetyl chloride and aluminum chloride, in a proportion of 2 moles of acetyl chloride and more than 2 moles of aluminum chloride per mole of meta-terphenyl, at a temperature ranging from −50° to 0° C.;

(b) heating the reaction mixture formed in step (a) to a temperature from 0° to 80° C., for a sufficient time to obtain a reaction product having the desired average molecular weight and softening temperature; and (c) subjecting the product from step (b) to acid hydrolysis and neutralizing and separating the resultant organic phase.

30. A process according to claim 29, wherein the acid catalyst is used in a proportion from 0.05 to 10% by weight with respect to the weight of said oligomer-containing composition.

31. A process according to claim 30, wherein the acid catalyst is used in a proportion of 1 to 5% by weight with respect to the weight of said oligomer-containing composition.

32. A process according to claim 29, wherein the oligomer-containing composition has a softening temperature of about from 100° to 180° C.; and wherein the oligomer-containing composition is heated to a temperature higher than the softening temperature of the oligomer-containing composition involved and the condensation is completed by raising the temperature to about 300°–350° C.

33. The thermostable polymer obtained according to the process of claim 29.

34. The thermostable polymer obtained according to the process of claim 32.